(12) United States Patent
Koski

(10) Patent No.: US 11,660,551 B2
(45) Date of Patent: May 30, 2023

(54) HOUSEHOLD WASTEWATER FILTER

(71) Applicant: Wex Companies, Inc., Milaca, MN (US)

(72) Inventor: Brian Koski, Mora, MN (US)

(73) Assignee: WEX COMPANIES, INC., Milaca, MN (US)

( * ) Notice: Subject to any disclaimer, the term of this patent is extended or adjusted under 35 U.S.C. 154(b) by 233 days.

(21) Appl. No.: 17/080,186

(22) Filed: Oct. 26, 2020

(65) Prior Publication Data

US 2021/0039024 A1 Feb. 11, 2021

Related U.S. Application Data

(63) Continuation-in-part of application No. 15/946,888, filed on Apr. 6, 2018, now Pat. No. 10,814,257.
(Continued)

(51) Int. Cl.
*B01D 29/56* (2006.01)
*B01D 29/64* (2006.01)
(Continued)

(52) U.S. Cl.
CPC ......... *B01D 29/6476* (2013.01); *B01D 29/13* (2013.01); *B01D 29/56* (2013.01);
(Continued)

(58) Field of Classification Search
CPC .... B01D 29/6476; B01D 29/13; B01D 29/56; B01D 29/902; B01D 29/35;
(Continued)

(56) References Cited

U.S. PATENT DOCUMENTS 337,050 A 3/1886 De Lisser
3,443,696 A 5/1969 Schutte
(Continued)

FOREIGN PATENT DOCUMENTS

EP 2949627 A1 12/2015
EP 3124674 A1 2/2017
(Continued)

OTHER PUBLICATIONS

Examination Report issued for corresponding European patent application No. 18166025.9 dated Jan. 14, 2021.
(Continued)

*Primary Examiner* — Chester T Barry
(74) *Attorney, Agent, or Firm* — Westman, Champlin & Koehler, P.A.; Amanda M. Prose

(57) ABSTRACT

A filter assembly and method of filtering wastewater from a washing machine. The filter has a framework for supporting a first filter stage and a second filter stage, a connection on a top of the filter assembly for connecting to a wastewater stream, a diffuser positioned to extend into the first filter stage and configured to rotate about a vertical axis of installation within the first filter stage, and a second filter stage below the first filter stage and configured to receive overflow from the first filter stage. The filter assembly does not include a motor or motorized parts and wherein the diffuser is rotatable by way of the force of the wastewater stream fed into the first filter stage to diffuse the wastewater stream and to spray the wastewater onto and through the filter media allowing the filter media to catch debris within the first filter stage.

10 Claims, 9 Drawing Sheets

Related U.S. Application Data

(60) Provisional application No. 62/482,718, filed on Apr. 7, 2017.

(51) Int. Cl.
  B01D 29/13 (2006.01)
  B01D 29/90 (2006.01)
  C02F 1/00 (2023.01)
  C02F 103/00 (2006.01)

(52) U.S. Cl.
  CPC ............ B01D 29/902 (2013.01); C02F 1/001 (2013.01); *B01D 2201/48* (2013.01); *C02F 2103/002* (2013.01); *C02F 2303/16* (2013.01); *C02F 2307/12* (2013.01)

(58) Field of Classification Search
  CPC .. B01D 29/6446; B01D 24/08; B01D 24/008; C02F 1/001; C02F 1/38; D06F 39/10
  See application file for complete search history.

(56) References Cited

U.S. PATENT DOCUMENTS

| | | | |
|---|---|---|---|
| 3,762,562 A | 10/1973 | Okuniewski et al. | |
| 3,804,258 A | 4/1974 | Okuniewski et al. | |
| 4,193,779 A | 3/1980 | Hencke | |
| 4,441,340 A | 4/1984 | Kaplan | |
| 4,731,260 A | 3/1988 | Balding et al. | |
| 4,842,772 A | 6/1989 | Withiam | |
| 4,969,934 A | 11/1990 | Kusik | |
| 5,228,993 A * | 7/1993 | Drori | B01D 29/684 |
| | | | 55/294 |
| 5,376,268 A | 12/1994 | Ikeda | |
| 5,582,716 A | 12/1996 | Nurse, Jr. | |
| 5,645,732 A | 7/1997 | Daniels | |
| 5,762,790 A | 6/1998 | Zoeller | |
| 5,795,472 A | 8/1998 | Nurse, Jr. | |
| 5,803,982 A * | 9/1998 | Kosofsky | B08B 3/08 |
| | | | 134/182 |
| 5,871,640 A | 2/1999 | Gavin | |
| 5,972,229 A | 10/1999 | Lundin | |
| 5,989,419 A * | 11/1999 | Dudley | B01D 41/04 |
| | | | 134/152 |
| 6,015,488 A | 1/2000 | Gavin | |
| 6,189,549 B1 * | 2/2001 | Fontana | B01D 17/0214 |
| | | | 210/801 |
| 6,210,311 B1 | 4/2001 | May | |
| 6,231,764 B1 | 5/2001 | Wilkins | |
| 6,267,879 B1 * | 7/2001 | Gil | B01D 29/6453 |
| | | | 210/414 |
| 6,338,797 B1 | 1/2002 | Nurse, Jr. et al. | |
| 6,391,198 B1 * | 5/2002 | Porter | B01D 17/00 |
| | | | 210/167.01 |
| 6,517,612 B1 | 2/2003 | Crouch et al. | |
| 6,531,062 B1 | 3/2003 | Whitehill | |
| 6,540,914 B1 | 4/2003 | Smith | |
| 6,666,968 B2 | 12/2003 | Smith et al. | |
| 6,846,349 B2 | 1/2005 | Eom | |
| 6,955,708 B1 | 10/2005 | Julos et al. | |
| 8,225,804 B2 * | 7/2012 | Publ | B08B 3/02 |
| | | | 134/84 |
| 2002/0121484 A1 | 9/2002 | Arai et al. | |
| 2006/0086674 A1 | 4/2006 | Morgan | |
| 2009/0071912 A1 | 3/2009 | Mishina et al. | |
| 2013/0319953 A1 * | 12/2013 | Ozawa | B01D 29/21 |
| | | | 210/747.6 |
| 2014/0197116 A1 | 7/2014 | Yanda | |
| 2015/0122723 A1 * | 5/2015 | Orlans | B01D 29/70 |
| | | | 210/411 |
| 2016/0288029 A1 | 10/2016 | Ayers et al. | |
| 2018/0290082 A1 * | 10/2018 | Koski | C02F 1/004 |
| 2018/0347100 A1 | 12/2018 | Poy et al. | |
| 2019/0281872 A1 * | 9/2019 | Cilia | C12C 7/205 |
| 2020/0230530 A1 * | 7/2020 | Levitt | B01D 11/0288 |
| 2021/0023482 A1 * | 1/2021 | Eisen | B01D 29/688 |
| 2021/0039024 A1 * | 2/2021 | Koski | B01D 24/008 |

FOREIGN PATENT DOCUMENTS

| | | |
|---|---|---|
| GB | 205430 A | 10/1923 |
| JP | 4522162 B2 | 8/2010 |
| KR | 20150103817 A | 9/2015 |
| WO | 98/31480 A1 | 7/1998 |

OTHER PUBLICATIONS

Third Party Observations Communication issued for corresponding European patent application No. 18166025.9 dated Oct. 12, 2020.
Search report issued for corresponding European patent application No. 18166025.9 dated Aug. 20, 2018.
Third Party Observations Communication issued for corresponding European patent application No. 18166025.9 dated Jul. 19, 2021.
Third Party Observations Communication issued for corresponding European patent application No. 18166025.9 dated Apr. 8, 2022.

* cited by examiner

HOUSEHOLD WASTEWATER FILTER

CROSS-REFERENCE TO RELATED APPLICATION

This application is a continuation-in-part of U.S. application Ser. No. 15/946,888, filed Apr. 6, 2018, now U.S. Pat. No. 10,814,257, which claims priority to U.S. provisional patent application Ser. No. 62/482,718, filed on Apr. 7, 2017, the contents of which are hereby incorporated in their entirety.

BACKGROUND

The present invention relates a wastewater or discharge filter for household and light industrial applications. More specifically, the present invention relates to a post-appliance filter for removing particles from a discharge stream from an appliance to protect sewer and septic system alike.

SUMMARY

An aspect of the present disclosure relates to a filter media comprising a non-woven felt material for filtering particles from a wastewater stream wherein the non-woven felt material filter is positioned within a wastewater stream from a washing machine and wherein the filter is positioned downstream of a washing machine wastewater drainage outlet.

The filter media may be configured for use with a gravity based wastewater filter mountable to a surface external to the washing machine or may be configured for use with a motorized wastewater filter mountable to a surface external to the washing machine.

The filter media can remove particles having a size less than about 200 micron from the wastewater stream.

Another aspect of the present disclosure relates to a wastewater filter system comprising a housing having an inlet and a outlet and the housing configured to support a disposable non-woven felt filter therein for filtering a wastewater stream passing from the inlet to the outlet and wherein the housing is configured to be mounted in a wastewater flow path downstream of and external to the wastewater source. The filter system comprises a support structure therein for supporting the filter within the housing. The wastewater source may be a household appliance such as a washing machine.

The housing is mounted between a discharge port of the washing machine and a drain.

In one embodiment that filter system comprises a rotatable drive shaft therein and operably connected to a filter holder for supporting the filter within the housing and wherein one or both of the filter holder and the filter are rotatable by rotation of the drive shaft for removing particles from the wastewater by centrifugal force. The filter system is motorized.

Yet another aspect of the present disclosure relates to a method of removing particles from a wastewater discharge from a washing machine comprising providing a filter system having a filter media therein for removing the particles from the wastewater stream; mounting the filter system within a wastewater flow path and downstream of a discharge port of the washing machine; and wherein the filter media is a non-woven mesh material.

The filter system may be motorized and use rotational forces within a housing of the filter system for removing particles from the wastewater discharge.

Alternatively, the filter system comprises a housing having an inlet positioned above an outlet with the filter media positioned therebetween and using gravity within the housing to remove particles from the wastewater discharge.

Yet another aspect of the present disclosure relates to a method of filtering water discharged from a household appliance such as a washing machine. The method comprises utilizing a filter device having a housing and a removable lid. The method comprises connecting a wastewater stream source to an inlet of the housing and connecting an outlet of the housing to a discharge tub or drain. The method utilizes a filter device that is configured for use in an "in-line" system, one that is positioned outside the wastewater source (e.g., external to the appliance) where the wastewater enters the system and exits the filter system to a drain or a tub. The filter device may be a gravity filter device or a motorized filter device as described above.

Another aspect of the present disclosure relates to a method of filtering fine or micro particles from a wastewater stream before the water enters a sewer system or a septic tank. The method includes providing a filter medium in a filter device to a wastewater stream. The stream may be defined as a stream leaving a household appliance and the system positioned downstream from the appliance and upstream from a drain or tank. The method further comprises providing a mounting bracket to the housing of the system for purposes of mounting the system near the appliance such that the system can effectively operate as an in-line system.

Yet another aspect of the present disclosure relates to the filter assembly comprising a framework for supporting a first filter stage and a second filter stage, a connection on a top of the filter assembly for connecting to a wastewater stream; a diffuser positioned to extend into the first filter stage and configured to rotate about a vertical axis of installation within the first filter stage; and a second filter stage below the first filter stage and configured to receive overflow from the first filter stage, wherein the filter assembly does not include a motor or motorized parts and wherein the diffuser is rotatable by way of the force of the wastewater stream fed into the first filter stage to diffuse the wastewater stream and to spray the wastewater onto and through the filter media allowing the filter media to catch debris within the first filter stage.

The filter assembly is secured downstream of a washing machine for filtering the wastewater stream therefrom.

The diffuser has a length provided with a plurality of scrubbing mechanisms spaced apart along the length of the scrubbing mechanisms. The scrubbing mechanisms comprise protrusions extending outwardly from the length of the diffuser. The scrubbing mechanisms are flexible mechanisms comprised of silicon, rubber, plastic or combinations thereof.

The second filter stage comprises a cup for catching overflow and wherein the cup is removable for cleaning.

The filter assembly is configured for use as a gravity based filter assembly and is mountable to a surface external to a washing machine The filter media therein is configured to remove particles having a size less than about 200 micron from the wastewater stream.

Yet another aspect of the present disclosure relates to a method of removing particles from a wastewater discharge from a washing machine comprising providing a filter assembly having a filter media and a rotatable diffuser therein for removing the particles from the wastewater stream and for self-cleaning of the filter assembly; mounting the filter assembly within a wastewater flow path and downstream of a discharge port of the washing machine; and wherein the wastewater flow discharged from the washing machine is directed into the filter assembly and the wastewater flow provides force to rotate the diffuser and spray the wastewater flow to and through the filter media.

Removing debris caught by the filter media includes further providing the diffuser with a plurality of scrubbers along its length and wherein ends of the scrubbers contact the filter media surface from inside the filter assembly as the wastewater stream rotates the diffuser.

The filter assembly is a dual stage filter and wherein the debris cleaned from the filter media is directed into a second stage filter where the second stage filter comprises a removable cup for removing the debris from the filter assembly.

DETAILED DESCRIPTION

Figure 1:
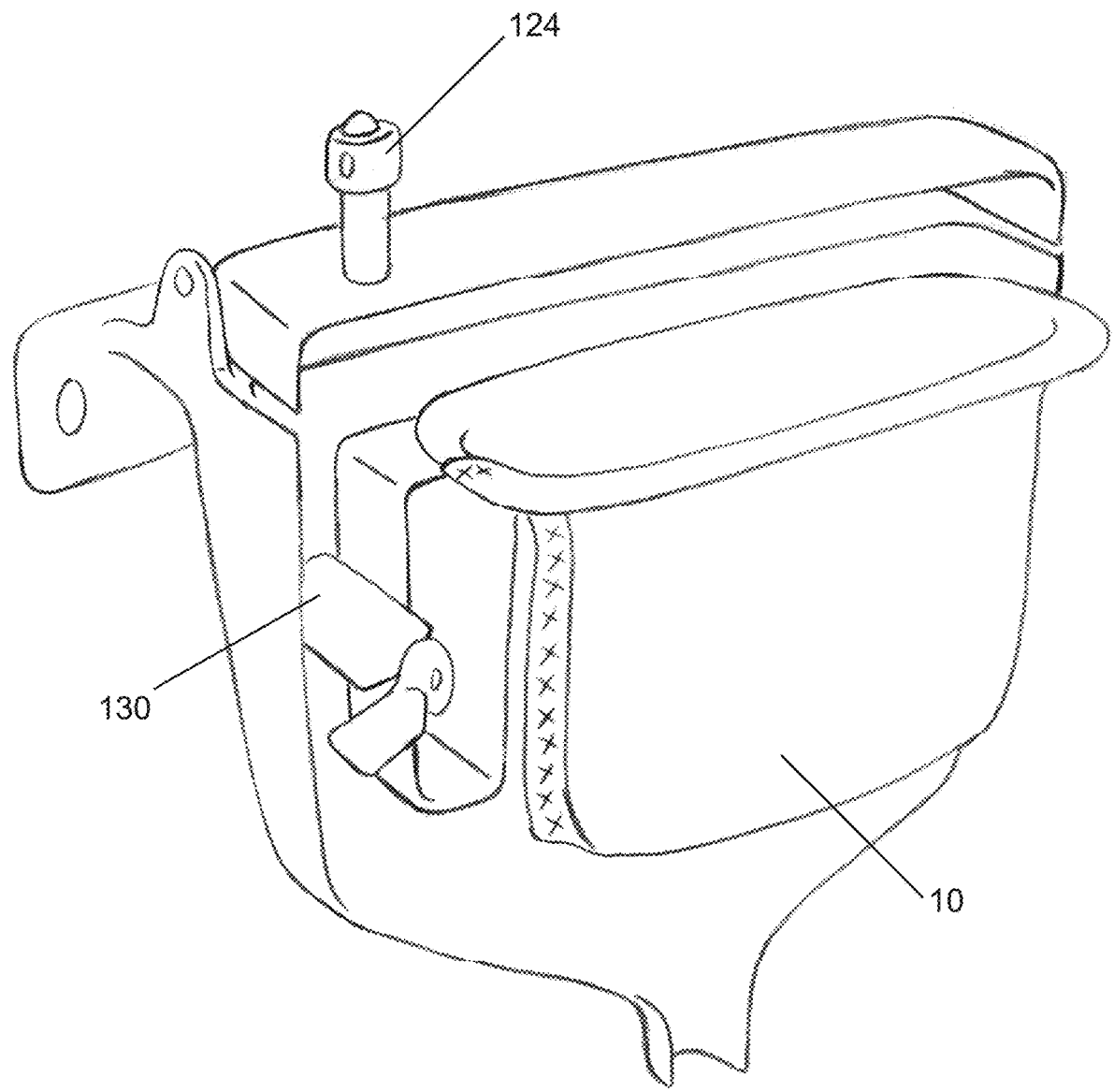
FIG. 1 is a perspective view of a gravity filter system of the present disclosure.

A filter system is configured to remove debris and particles such as lint, hair, and other contaminates from household waste water, for example a washing machine discharge. The heavy duty design of the system allows the system to have an increased usage life span. The system can be used with a septic system to reduce septic system failures caused by lint. Additionally, in view of growing environmental concern over microfiber pollution, the system can also be used with city sewer systems as well. Microfibers are defined as fibers less than 1000 microns in size. According to a recent study, the system can remove over 50% of microfibers from washing machine discharge with a single stage bag style filter.

Filters according to this disclosure system may generally be used in residential and light commercial applications such as apartment buildings or assisted living facilities. Some jurisdictions enforce the Universal Plumbing Code which states all commercial facilities with washing machines must install a filtration devise to remove particles larger than ½" from the washing machine discharge. The filters and devices described herein can be used to fulfill this requirement. Septic system owners may also use the system described herein to remove lint and other particles from their waste stream, which reduces the impact of problems created by lint on septic systems. An additional benefit includes reduced drain and sewer line plugging from lint and hair.

A disposable filter media 10 can be used with a filter system to remove particles from a wastewater stream. For example, the wastewater stream is a waste water stream from a household appliance such as a washing machine. The filter 10 is held in a housing where the waste water stream passes through the housing. The housing is positioned outside of the appliance such that the housing and thus the filter 10 are external to the appliance. The waste water is discharged from the appliance and is directed into the housing through an inlet and passes through the filter media 10 where particles are removed from the waste water stream by the filter media 10 and the filtered waste water is directed from the housing through an outlet.

The filter media 10 may comprise a non-woven, felt material or felt like material capable of capturing particles or otherwise preventing particles in the water from passing through the housing. The filter media is configured to remove particles being less than about 200 micron in size. For example, the filter media may be configured to remove particles from the wastewater stream wherein the particles have a size in the range of about 200 micron to about 50 micron.

Examples of filter media may include but are not limited to non-woven wool felt or similar materials. The filter media can be provided in various densities and thicknesses as well as various degrees of hardness to provide selected filtration for various waste water streams based on the average or general size of the particles to be removed from the wastewater stream.

Figure 2:
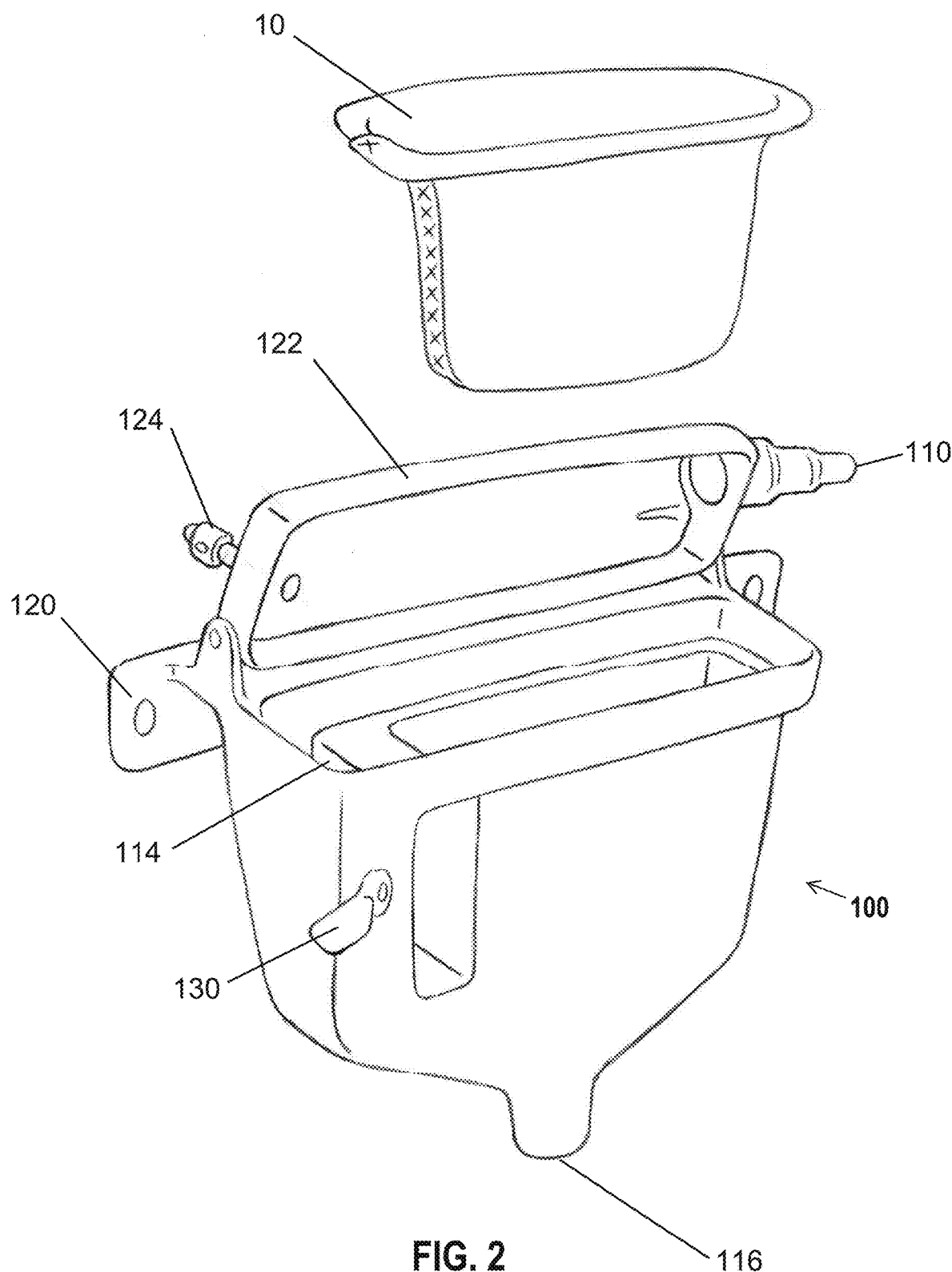
FIG. 2 is a perspective view of the gravity filter with a side surface removed for providing a component view of the system.

In an embodiment illustrated in FIGS. 1-2, the filter media 10 may be used in a gravitational filter system 100 wherein the gravitational filter system is provided in a wastewater stream from an appliance. The gravitational filter system 100 is configured for mounting to an external surface of the appliance or on a sink wall or other surface external to the appliance such that the water is drained from the appliance having particles therein and is directed through the filter system 100 and through the filter media 10. The wastewater stream is directed through the filter 10 and filter system 100 via gravity. The stream enters the system 100 through an inlet 110 in an upper portion of a housing 112 and into the housing 112 where the filter media 10 is positioned inside a filter holder 114. Filtered water having the particles removed then flows out of the housing 112 through an outlet 116 in a lower portion of the housing 112. That is, when mounted in an upright position, the inlet 110 is positioned at least partially above the filter media 10 and the inlet 110 and the filter media 10 are positioned above or over the outlet 116. The outlet 116 may then be operably connected to a drainage tube or provided near a drain or water receptacle.

In further detail, the gravitational filter system 100 comprises the housing 112 having an external mounting plate 120 attached thereto. The housing 112 has a removable cover 122 which may be hingedly secured to the housing 112. In the embodiment illustrated, the inlet 110 is a water inlet position in the cover 122, however the inlet can be integral to the housing 112 as long as the inlet 110 is connected to an area above the filter 10. The inlet may comprise a stepped hose connector or is otherwise configured for attaching to a hose or tubing providing the wastewater flow. An air bleed 124 is also provided to the gravitational filter system housing 112.

Inside the housing 112 is a filter mount 126 which receives and holds the removable filter 10. The housing 112 is also configured with an overflow channel 128 for wastewater directed to the filter 10 and an overflow indicator or sensor 130 may be also provided for alerting users to a full or spent filter 10 or other condition of the system 100. The filter 10 can be replaced and the system 100 continuously reused for filtering particles from a wastewater stream.

The filter 10 may be provided in any shape and may comprise one or more layers of filter media. For example, the filter may be provided in a rectangular or cylindrical shape wherein the filter has side walls and a floor for providing increased surface area for filtration The system 100 can be mounted to an external surface of a washing machine for filtering lint and other particles from the wastewater draining from the machine during washing. The system is mounted between the machine and a drain and thus is "in-line" with the wastewater stream. The system is an add-on to standard appliances such that the filter can be used with pre-existing units.

Figure 3:
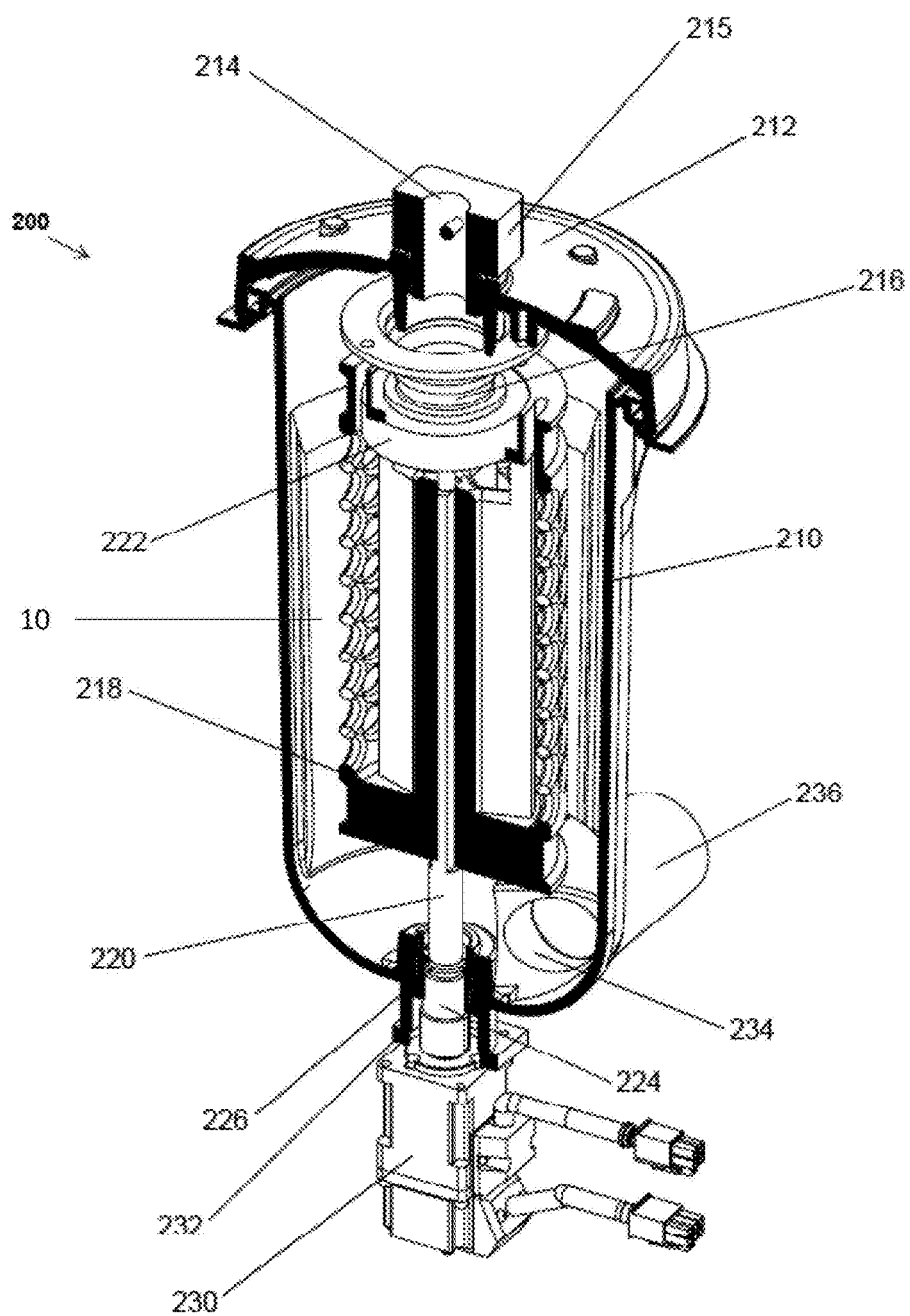
FIG. 3 is perspective view of a motorized filter system of the present disclosure.
Figure 4:
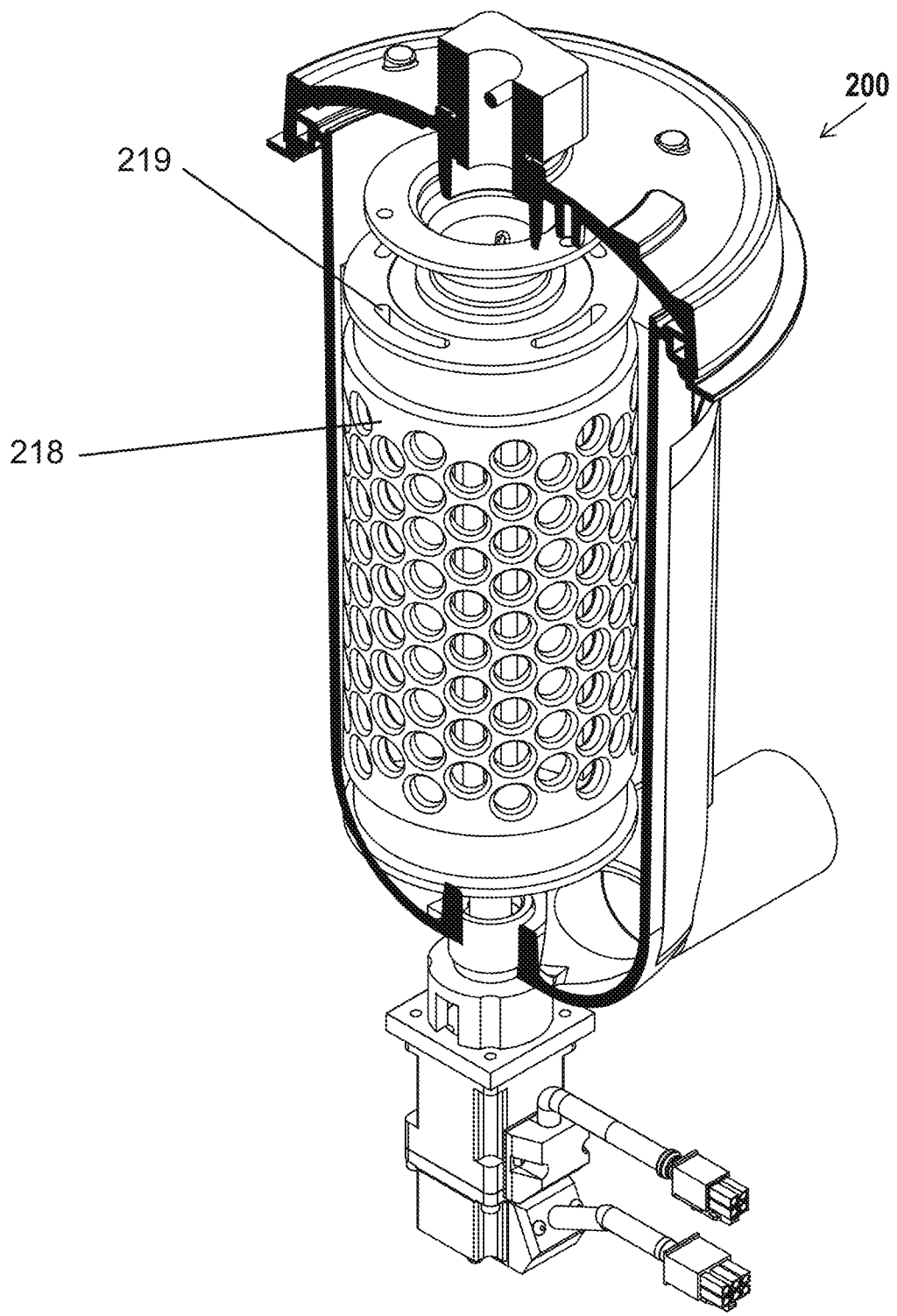
FIG. 4 is a cross-sectional side view of the motorized filter system exposing a filter cage.
Figure 5:
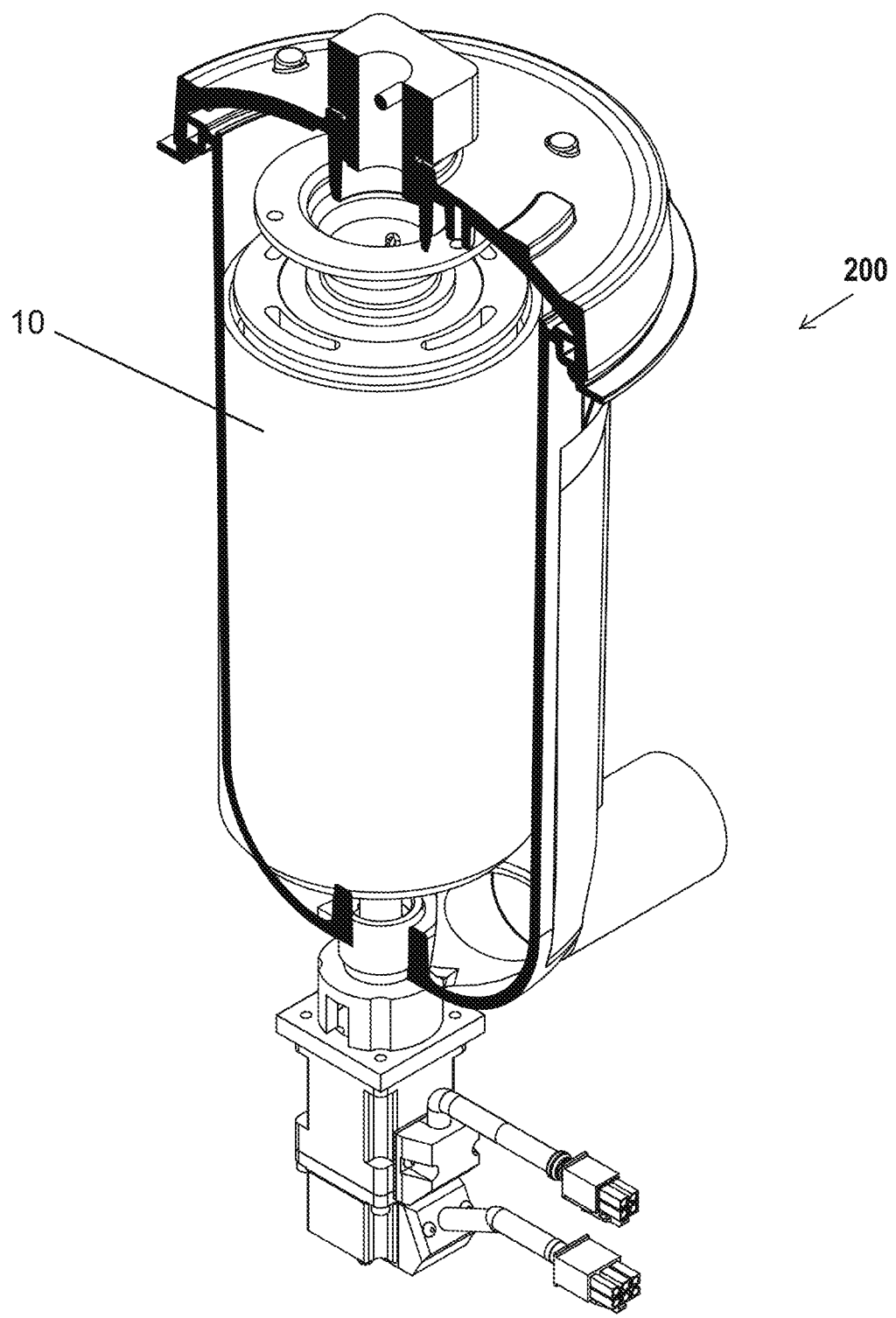
FIG. 5 is a cross-sectional side view of the motorized filter system exposing a filter.

In an another embodiment as illustrated in FIG. 3-5, the filter media 10 may be used in a motorized filter system 200, wherein the motorized filter system 200 is provided in the wastewater stream from the appliance and is also configured for mounting to an external surface of the appliance or other surface such as a sink wall or other upright surface external to the source of the wastewater stream.

In further detail, the motorized filter system 200 is illustrated at FIGS. 3-5. The system 200 comprises a first housing 210 having a removable cover 212 and a water inlet 214 configured for connecting to a tubing for delivering the wastewater stream from the appliance to the filter system 200. The wastewater stream enters the filter system 200 through the inlet 214 and is directed to a water funnel 216 for controlling flow of the stream into the filter. A water flow sensor 215 may be provided at or near the inlet 214 to monitor the wastewater stream flowing into the housing 210 and/or the water level of the wastewater in the filter as the stream passes through the filter housing 210.

Inside the first housing 210 is a second housing, which is a filter mount cage 218 which is operably secured to a drive shaft 220 which is rotationally secured to the first housing 210 via a first and a second bearing 222, 224. The filter mount cage 218 holds a filter therein. The filter may be the filter media 10 described herein. The filter mount cage 218 is a porous housing allowing for water to flow therethrough and into the cage 218. The filter mount cage 218 may have a plurality of openings therein for allowing water to flow through. The openings may be of a first size, greater than about 200 micron to prevent particles greater than the aperture size from passing through to the filter, while the filter 10 inside the cage 218 removes finer particles during operation of the filter system 200. As described further below, the filter system 200 utilizes centrifugal force inside the housing 210 to prevent the particles in the wastewater from exiting the housing with the filtered water stream.

A liquid seal 226 seals the housing 210 such that the housing 210 can be water tight. The drive shaft 220 is operably connected to a motor 230 where the motor 230 is secured to the housing 210 via a motor mount 232. The motor 230 may be an electric motor, although battery operated motors are also contemplated. Operation of the motor rotates the drive shaft 220, to in turn rotate the filter mount housing 218 and/or the filter 10. Rotation of the filter mount housing 218 and/or filter 10 allows for increased particle separation from the wastewater stream via centrifugal force. The water passes through the housing 210 and the filter mount housing 218 while the particles in the wastewater stream are collected on or in the filter media 10.

The housing 210 is configured with a water collection area 234 positioned in a lower portion of the housing 210 and adjacent to an outlet 236. The outlet 236 can be coupled to a tubing for directing the filtered water to a drain for delivery away from the appliance and/or to a sewer or septic system. The water has been filtered such that particles that can cause damage or clogging of the drain or septic system and/or otherwise should not be directed to the sewage system are removed.

The filter 10 is replaceable by way of removal of the cover 212 from the housing 210. Removing the cover 212 exposes the inside of the housing 210 for cleaning and filter replacement.

The housing 210 is also configured for mounting to an external surface of the appliance or to any upright surface near the wastewater stream.

The system 200 can also be mounted to an external surface of a washing machine for filtering lint and other particles from the wastewater draining from the machine during washing. The system is mounted between the machine and a drain and thus is "in-line" with the wastewater stream. The system is an add-on to standard appliances such that the filter can be used with pre-existing units A dual stage filter and flow diffuser system is also contemplated to increase not only the removal rates of the particles but increases the efficiency in doing so and the range of particle sizes removed.

Figure 7:
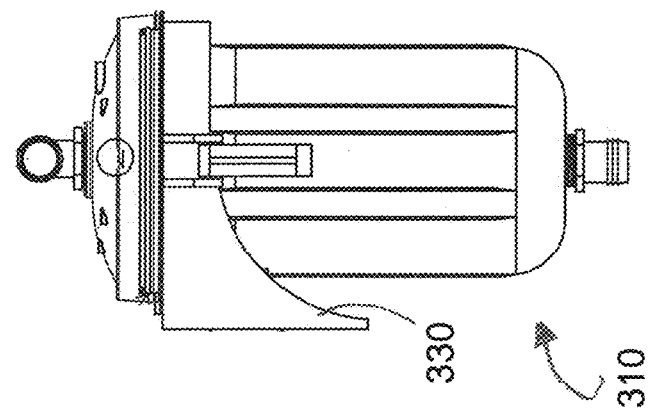
FIG. 7 is a top view of the dual stage filter mounting of the present disclosure.
Figure 6:
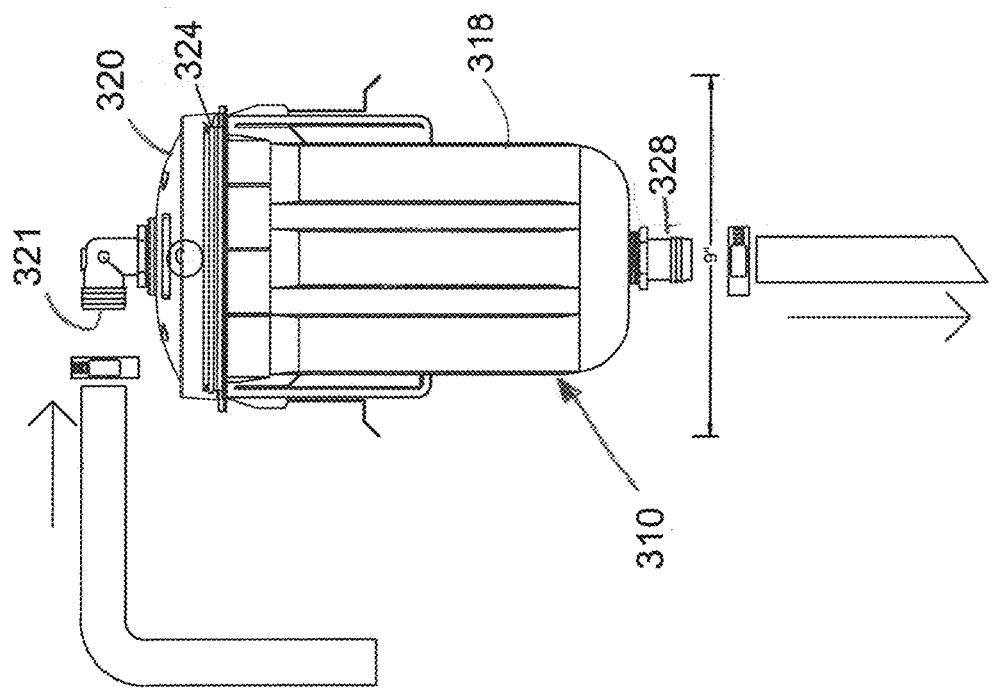
FIG. 6 is a side view of a dual stage filter mechanism of the present disclosure.
Figure 8:
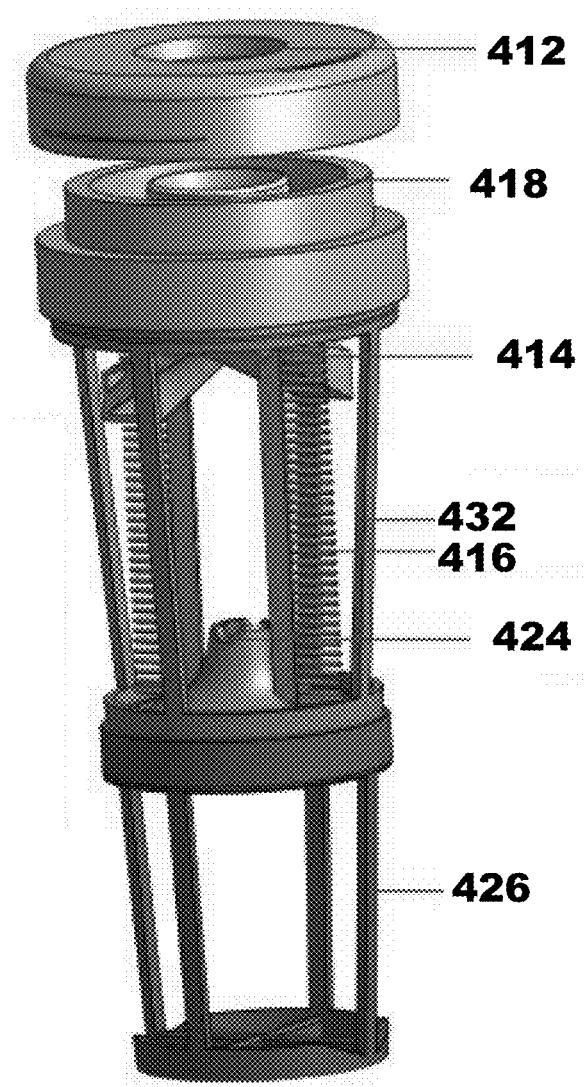
FIG. 8 is side view of a dual stage filter assembly with the filter media removed for ease of illustration.
Figure 10:
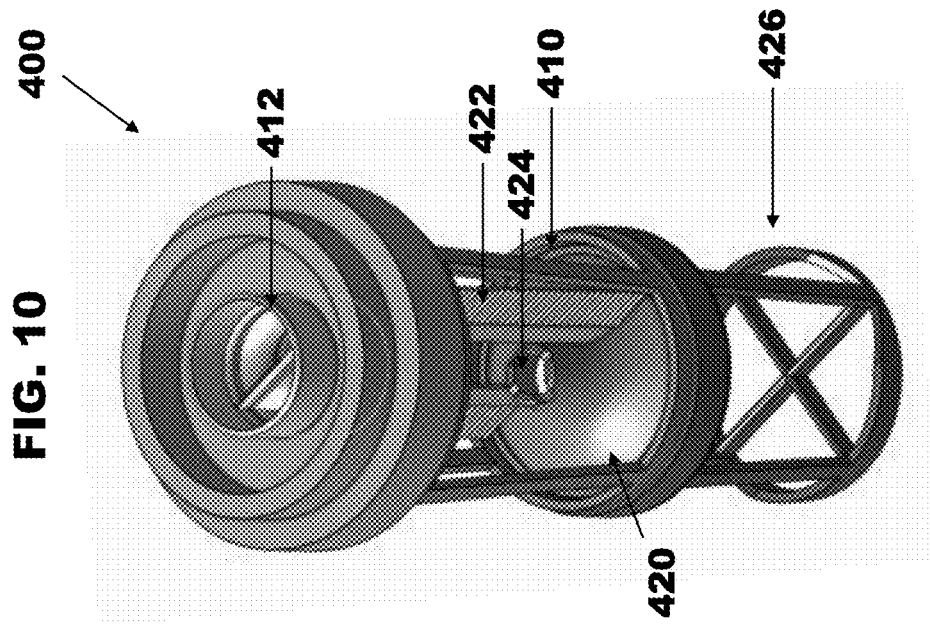
FIG. 10 is a top perspective view of the dual stage filter system.
Figure 9:
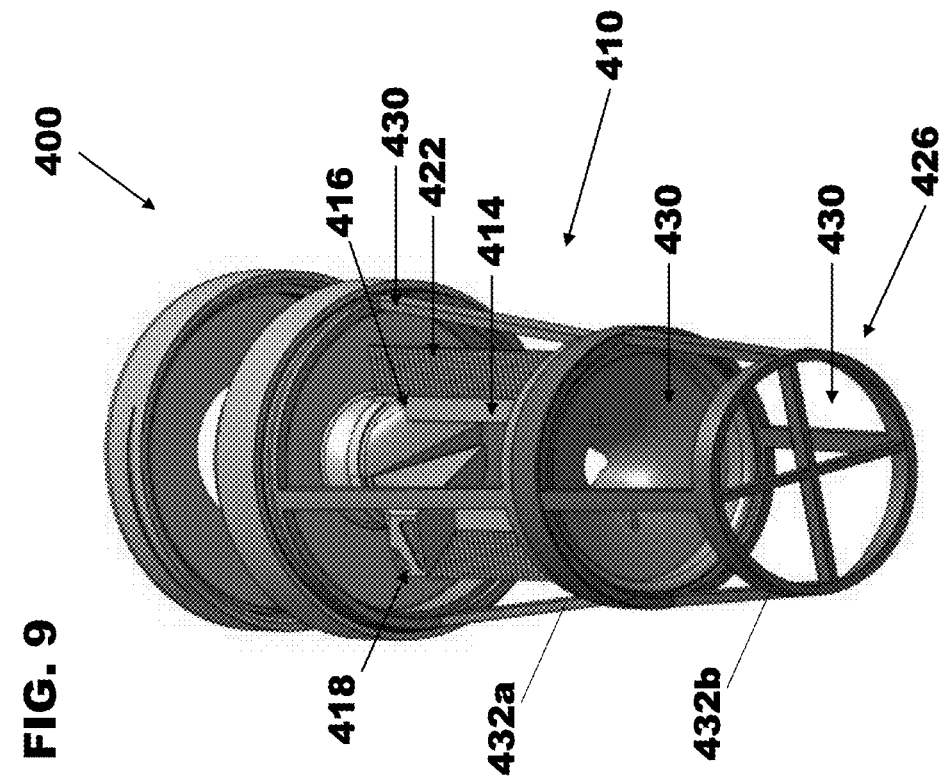
FIG. 9 is a bottom perspective view of the dual stage filter system.
Figure 12:
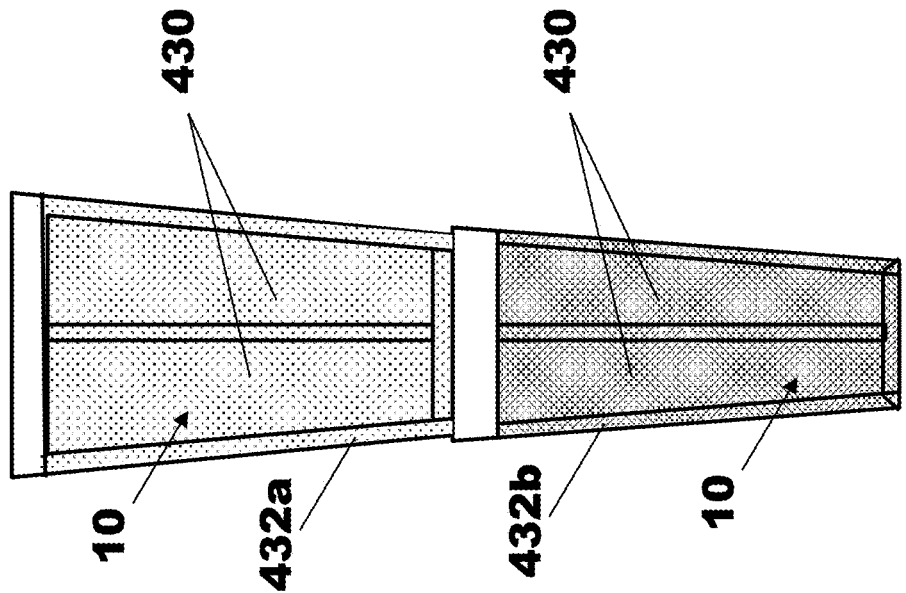
FIG. 12 is a front view of first and second filter stage frameworks supporting first and second filter media thereon with additional filter system mechanisms removed for ease of illustration.
Figure 11:
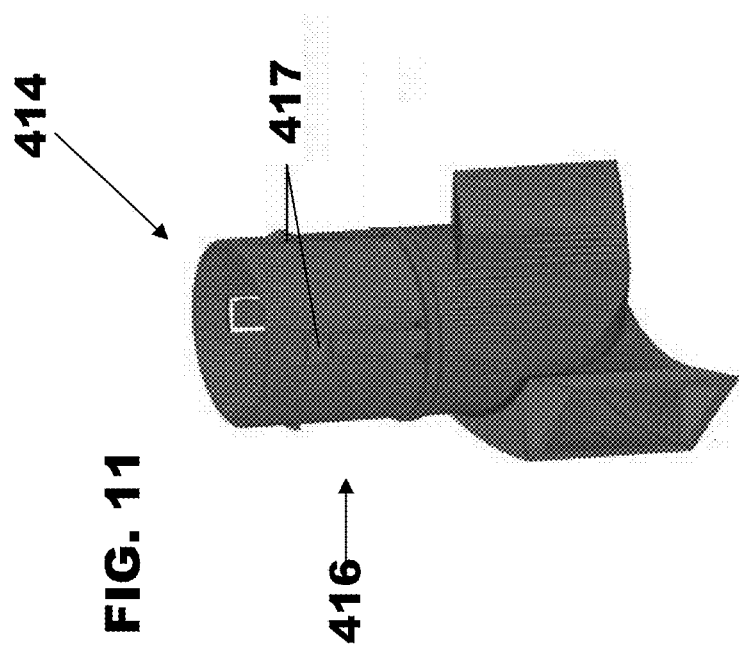
FIG. 11 is a side view of a diffuser for the dual stage filter system.

A filter system 300 is illustrated generally in FIGS. 6-7. The filter system 300 is again mountable within a waste or discharge stream, the stream being from an appliance such as a washing machine to a city sewer or septic system. Use with various household or light industrial machines is possible and the system may be used in any kind of waste or discharge stream for fluids with microfiber and other particle contaminants.

The filter system 300 comprises a filter housing 318, also referred to as a "canister" 318 and a removable lid 320 therefor. An O-ring may be provided for sealing the connection of the lid 320 to the housing 318 and for providing a water tight closure of the housing 318.

An outer surface of the lid 320 has an inlet 321. The inlet 321 is configured for connection to the waste or discharge stream and is connected to the source. The inlet 321 may be connected to a hose or tube for delivering wastewater from the source into the system 310 for filtration. The hose may be connected to a washing machine or other household appliance.

A filter mechanism is positioned within the housing 318 and is connected to the lid 320 such that the filter mechanism is configured to receive the wastewater entering the system from the inlet 321. The lid fits on top of the housing 318 and o-ring. The center of the lid 320 may include a threaded tap for a threaded barb fitting to be installed for the inlet 321. A diffuser may be installed inside the lid 320 to evenly distribute the discharge into the filter bags 312, 314.

The filter mechanism comprises a first filter 312, a prefilter component. The first filter 312 may be a bag or a rigid filter component. The first filter is configured for removal of particles having a size greater than about 200 microns. Thus, the first filter 312 may have apertures or an approximately 200 micron mesh pattern. The filter 312 is approximately a 200 micron filter such that particles greater than about 200 micron will be trapped within the first filter 312 while the water and particles less than about 200 micron are allowed to flow through the first filter 312.

The first filter 312 is positioned within a second filter 314, an outer filter. Both filters 312, 314 are positioned within the housing 318. The outer filter 314 may be a bag or rigid filter that is larger than the first filter 312 such that the first filter 312 fits within the second filter 314. A space 322 is provided between the outer surface or mesh of the first filter 312 and the inner surface of the second filter 314. This spacing is configured for collecting particles of a size less than the mesh diameter of the first filter 312 (particles passing through the first filter, e.g., less than about 200 micron in size) wherein the particles are larger than the mesh diameter of the second filter 314 and for enhancing flow of the water through the system 310. The second filter 314 is a filter having a mesh or aperture size of about 20 micron. That is, the filter 314 is configured to allow passage of water and particles less than about 20 micron in size there through while retaining particles larger than about 20 micron in the spacing 322 or otherwise within the filter mechanism.

The system 310 can be used with a filter that comprises a plastic bag ring and mesh filter bag sewn to the plastic bag ring. The filter hangs into the canister but does not touch the bottom of the canister. The filter bag ring sits on top of a lip provided in the filter canister. The lid fits over the canister and filter holding it in place.

The system 310 as illustrated in FIGS. 6-9 includes the filter mechanism comprising a two piece filtration 312, 314 system that sits inside of the filter canister 318. The exterior filter 314 provides final filtration of particles less than about 50 microns. The filter may have a mesh between about 5 micron and about 50 micron such that particles of less than about 5 to about 50 microns are removed from the waste or discharge stream. The interior filter 312 may provide filtration of particles of about 300 micron to about 200 micron in size such that particles of less than about 300 to less than about 200 micron are removed from the waste or discharge stream first. The waste or discharge flows into the interior filter first 312, then into the exterior filter 314. Both filters comprise an overflow/bypass feature at the top of the filter ring 326 which allows the discharge to flow over the top of the filter and out of the filter canister 318, in case of a filter plug.

The water having passed from the source, through the inlet 321 and into the housing 318 then passes through the first filter 312 and through the second filter 314. This water or discharge water has efficiently been filtered through the first and second filters to remove any particles greater than about 200 micron for example, and any particles greater than about 20 micron in size for example. The filtered water, wherein particles of less than about 20 micron may remain, passes through the second filter 314 and into a discharge flow path 316. A lower end of the housing 318 is configured with an opening for a discharge flow path. The discharge flow path passes from the filters 312, 314 to the outer portion of the housing 318 and to an outlet 328. The outlet 328 is configured for connection to the waste or discharge stream in that the outlet 328 connects the filter system 310 to a flow path via a hose or tube to a drain, a sewer system, or a septic system where filtered waste water can safely be discharged.

The inlet connection 321 and the outlet 328 of the system housing 318 allow for the system 310 to be positioned between any appliance or mechanism which utilizes a fluid for functioning.

The filter mechanism may also be a removable mechanism. The first filter 312 is positioned within the second filter 314 and upper portions, or openings, of each filter 312, 314 are secured within the housing 318 to the lid 320 by way of connection with a lid ring 324 as illustrated in FIG. 6. The lid ring secures the first filter 312 and the second filter 314 along with an overflow mechanism 326 near the top of the housing 318 so that the filters 312, 314 extend into the housing 318 and are secured to the housing 318 with the lid 320. Once the filter mechanism has been used sufficiently and/or has collected filtered particles, the lid 320 and ring 324 can be removed from connection with the housing 318 and the filters 312, 314 rinsed and cleaned and particles removed, or replaced with a new filter mechanism altogether. The discharged fluid will drain vertically through the system and out the outlet 328 with ease.

The housing 318 is configured to fit inside the mounting bracket 330 and creates an open vessel for the filters 312, 314 to be installed. The housing 318 is configured to produce a small amount of surge capacity for the discharge, and is also configured to be substantially empty and drained of water when the discharge flow stops (e.g., when a washing machine cycle is complete). The rubber O-ring may then be installed at the top of the housing 318 to provide a water tight connection to the lid 320. The housing 318 may also be a bottom draining housing and includes a threaded tap for a 1″ straight nipple to be installed. A discharge hose may then be connected on the nipple with stainless steel hose clamps to provide a water tight connection at the outlet 328 for discharge. This allows the discharge hose to be directed to a laundry tub or other drain receptacle at an angle no greater than about 45 degrees for enhanced filtering and draining.

Any of the housings or components described herein may be comprised of a reinforced plastic material or other sturdy material that is optically transparent for easy viewing of the amount of particulate filtered from the stream.

In the embodiments described herein, a discharge hose can be attached to an outlet via a fitting with stainless steel hose clamps or other fitting mechanisms to provide a water tight connection.

In one or more embodiments described herein, effluent from the washing machine enters a top of a first filter stage 410 through a universal hose connection 412. This connection allows the discharged wastewater to flow into and through the filter stage 400 powered by the discharge pump inside the washing machine. That is, the flow of the wastewater discharged from the washing machine provides the flow to and through the filter assembly 400. No additional motor is provided, or necessary, for moving water through the filter as described herein. A flow rate of this discharge wastewater flow is also sufficient to spin what is referred to herein after as a diffuser 414 of the filter assembly 400.

The universal hose connection 412 also allows the hose to connect to the filter assembly via a lid of the filter housing (external housing not shown).

The diffuser 414 has an end 416 that fits inside a bearing 418 with glass balls, such as a PVC bearing with glass balls so that the bearing is corrosion proof. The diffuser 414 is provided with small notches 417 on a top end 416 of the diffuser 414 which holds the diffuser 414 in place within the filter assembly 400. The diffuser 414 has a length extending along the first stage of the filter 410. The diffuser 414 may be rotatable about the connection with the bearing 418. The diffuser 414 allows effluent from the washer to be sprayed against a primary filter wall 420, which provides a spinning momentum to the diffuser 414. That is, the water flow from the washer is directed into the filter assembly 400 through the connection 412 and is diffused by the diffuser 414 into a water spray and as this water spray hits the inside wall of the filter media of the first stage 410, the diffuser 414 spins. No motor is required in the filter assembly to spin the diffuser.

The diffuser 414 may also be provided with scrubbers 422 on one or more sides of the diffuser. The scrubbers 422 may be spaced apart and positioned along the length of the diffuser. By way of non-limiting example, flexible and resilient protrusions, such as silicon scrubbers are provided on two sides of the diffuser. Additional or alternative materials can include cloth type scrubbers or scrubbers formed of various plastic resins or rubber. Ends of the scrubbers 422 may also contact the inside of the filter media to continuously scrub the filter media surface or may contact debris caught in the filter media for removing that debris from the filter media surface. The scrubbers function to contain or "ball up" the debris caught by the filter media, such as lint particles, into bigger pieces and the water spray from the diffuser serves to flush the balled up debris down toward and to the bottom of the first stage of the filter 410.

Fibers or debris that are caught by the filter are washed down to the bottom of the first stage filter 410 where an overflow mechanism 424 is placed. The internal overflow is set about ½" off the bottom of the first stage 410 of filtration so that the fibers become concentrated prior to spilling over to a waste catch 426. The fibers concentrate near the bottom and eventually overflow into this second "catch" filter 426. This is where fibers are concentrated further and dewatered by gravity. The secondary catch 426 may be a cup that can be removed for easy disposal of the fibers/lint or other debris.

This filter assembly 400 is meant to be installed inside a sealed enclosure or housing such a filter housing or canister according to one or more embodiments herein. No housing is shown for ease of illustration.

The filter media 10 may be a mesh screen or other non-woven material according to any one of the embodiments described herein. The filter media 10 is secured around the first stage 410 of the filter covering the openings 430 bounded by the filter assembly framework 432. The framework 432 includes the framework 432a for the first stage 410 and framework 432b for the removable second stage.

The embodiments herein can be used with a washing machine, although the filter and/or systems described herein can be used with any various appliance or machine where a fluid such as a waste water or cleaning liquid requires filtering of fine particles before the fluid can be discarded or directed to a sewer system or septic tank. The systems can be positioned within any waste fluid flow path or discharge flow path by fluid connection with a waste source via a first hose or tube at the inlet and connection with discharge flow via a second hose or tube in fluid connection with the outlet.

The embodiments herein may also have an outer portion of the housing that is also configured for installation of the system in various locations. The system can be mounted in such a manner that maintenance is allowed while the system remains mounted (e.g., filters can be removed/replaced/cleaned without removal of the system from the mounting). One or more mounting brackets is configured to hold the housing while being configured for securing to a stud, a wall, or another sturdy fixture. The mounting bracket(s) can be attached to a concrete or stud wall or otherwise to the external surface of the appliance by other clips which secure the housing in an upright and level position. Securing mechanisms, examples of which include but are not limited to stainless steel clips hold the cover tightly on the housing to prevent movement and leaks.

Although the present disclosure has been described with reference to preferred embodiments, workers skilled in the art will recognize that changes may be made in form and detail without departing from the spirit and scope of the disclosure.

The invention claimed is:

1. A filter system comprising:
 a filter assembly comprising:
  a framework for supporting a first filter stage and a second filter stage;
  a connection on a top of the filter assembly for connecting the filter assembly to a wastewater stream;
  a diffuser positioned to extend into the first filter stage and configured to rotate about a vertical axis of installation within the first filter stage;
  a second filter stage below the first filter stage and configured to receive overflow from the first filter stage;
 wherein the filter assembly does not include a motor or motorized parts and wherein the diffuser is rotatable by way of the force of the wastewater stream fed into the first filter stage to diffuse the wastewater stream and to spray the wastewater onto and through the filter assembly allowing the filter assembly to catch debris within the first filter stage.

2. The filter system of claim 1 wherein the filter assembly is secured downstream of a washing machine for filtering the wastewater stream therefrom.

3. The filter system of claim 1 wherein the diffuser has a portion provided with a plurality of scrubbing mechanisms spaced apart along said portion of the diffuser.

4. The filter system of claim 3 wherein the scrubbing mechanisms comprise protrusions extending outwardly from the portion of the diffuser.

5. The filter system of claim 3 wherein the scrubbing mechanisms are flexible mechanisms comprised of silicon, rubber, plastic or combinations thereof.

6. The filter system of claim 1 wherein the second filter stage has a filter media configured for catching overflow and wherein the second filter stage is removable for cleaning.

7. The filter system of claim 1 wherein the filter assembly is configured for use as a gravity-based filter assembly and is mountable to a surface external to a washing machine.

8. The filter system of claim 1, wherein the filter assembly further comprises a filter media in at least one or the first filter stage and second filter stage wherein the filter media is configured to remove particles having a size less than about 200 micron from the wastewater stream.

9. A method of removing particles from a wastewater discharge from a washing machine comprising:
 providing a filter assembly having a filter media and a rotatable diffuser therein for removing the particles from the wastewater stream and for self-cleaning of the filter assembly;
 mounting the filter assembly within a wastewater flow path and downstream of a discharge port of the washing machine; and
 wherein the wastewater flow discharged from the washing machine is directed into the filter assembly and the wastewater flow provides force to rotate the diffuser and spray the wastewater flow to and through the filter media, and
 wherein the filter assembly is a dual stage filter and wherein the debris is cleaned from the filter media of a first stage of the filter assembly is directed into a second stage filter of the filter assembly and wherein the second stage filter of the filter assembly is removable from the filter assembly.

10. The method of claim 9 and removing debris caught by the filter media and further providing the diffuser with a plurality of scrubbers along a portion thereof and wherein ends of the scrubbers contact a surface of the filter media from inside the filter assembly as the wastewater stream rotates the diffuser.

\* \* \* \* \*